US011252540B2

(12) United States Patent
Verwimp et al.

(10) Patent No.: US 11,252,540 B2
(45) Date of Patent: Feb. 15, 2022

(54) SYSTEM AND METHOD BASED ON NOVEL SMS DELIVERY MECHANISM

(71) Applicant: Belgacom International Carrier Services, Brussels (BE)

(72) Inventors: Gery Irma Emiel Verwimp, Brussels (BE); Rajarshi Sanyal, Brussels (BE)

(73) Assignee: Belgacom International Carrier Services, Brussels (BE)

( * ) Notice: Subject to any disclaimer, the term of this patent is extended or adjusted under 35 U.S.C. 154(b) by 131 days.

(21) Appl. No.: 16/220,551

(22) Filed: Dec. 14, 2018

(65) Prior Publication Data

US 2019/0191282 A1    Jun. 20, 2019

(30) Foreign Application Priority Data

Dec. 14, 2017   (EP) .................................... 17207474

(51) Int. Cl.
*H04W 4/14* (2009.01)
*H04W 8/04* (2009.01)
(Continued)

(52) U.S. Cl.
CPC .............. *H04W 4/14* (2013.01); *H04L 45/04* (2013.01); *H04L 51/38* (2013.01); *H04W 8/04* (2013.01);
(Continued)

(58) Field of Classification Search
CPC ....... H04W 4/14; H04W 8/04; H04W 88/184; H04L 45/04
See application file for complete search history.

(56) References Cited

U.S. PATENT DOCUMENTS 9,338,618 B2 * 5/2016 Holubec ................. H04W 8/08
10,154,403 B2 * 12/2018 Stein ...................... H04W 8/10
(Continued)

FOREIGN PATENT DOCUMENTS

EP    2387259 A1 * 11/2011

*Primary Examiner* — Redentor Pasia
(74) *Attorney, Agent, or Firm* — Leydig, Voit & Mayer, Ltd.; Gerald T. Gray

(57) ABSTRACT

In a system and method for transporting SMS message between sending MNO and receiving MNO, wherein the receiving MNO uses a sponsor, a component is provided either in the network of the receiving MNO or, preferably, at the carrier of the receiving MNO.
The component is in the routing path between the sending MNO and the routing MNO and/or in the return path and preferably in both paths. The component (WB) manages and enforces the proper SMS delivery methods to the receiving MNO by introducing itself in the SRI for the SMS request as a sending party, using a sponsored network entity (SMSC-WB), and/or introducing itself in the SRI of the SMS response message as a receiving party using a sponsored network identity (VMSC-WB, HLR-WB). The component may further gather information relating to arrangements on transport of SMS messages between the sending MNO and the receiving MNO and sponsoring and/or roaming agreement of the receiving MNO and is capable of using the gathered information for amending SRI data for the SMS request and/or the SMS response message. The method and system of the invention allows any MNO to instantly adopt and cherry-pick on the SMS interworking portfolio of sponsor MNOs without the hassle of negotiating bilateral agreements or hub provider agreements.

13 Claims, 8 Drawing Sheets

(51) Int. Cl.
  *H04L 12/58*    (2006.01)
  *H04W 88/18*   (2009.01)
  *H04L 12/715*  (2013.01)
  *H04W 8/26*    (2009.01)
  *H04W 92/02*   (2009.01)

(52) U.S. Cl.
  CPC ............ *H04W 88/184* (2013.01); *H04W 8/26* (2013.01); *H04W 92/02* (2013.01)

(56)                References Cited

U.S. PATENT DOCUMENTS

| | | | |
|---|---|---|---|
| 10,243,813 B2 * | 3/2019 | Hegde | H04L 47/125 |
| 10,291,613 B1 * | 5/2019 | Risso | H04L 63/0876 |
| 10,567,949 B2 * | 2/2020 | Shah | H04W 8/12 |
| 2008/0125116 A1 * | 5/2008 | Jiang | H04W 60/00 |
| | | | 455/433 |
| 2009/0131087 A1 * | 5/2009 | Johan | H04W 4/14 |
| | | | 455/466 |
| 2010/0136967 A1 * | 6/2010 | Du | H04W 8/205 |
| | | | 455/432.3 |
| 2011/0294472 A1 * | 12/2011 | Bramwell | H04W 40/244 |
| | | | 455/413 |
| 2012/0282924 A1 * | 11/2012 | Tagg | H04W 48/18 |
| | | | 455/432.1 |
| 2016/0183081 A1 * | 6/2016 | Flores Cuadrado | H04M 15/52 |
| | | | 455/558 |
| 2016/0286377 A1 * | 9/2016 | Stein | H04W 8/205 |
| 2017/0019779 A1 * | 1/2017 | Shah | H04W 8/12 |

* cited by examiner

SYSTEM AND METHOD BASED ON NOVEL SMS DELIVERY MECHANISM

CROSS-REFERENCES TO RELATED APPLICATIONS

This application claims priority to EP application 17207474, filed on Dec. 14, 2017, which is incorporated by reference herein.

TECHNICAL FIELD

The invention introduces a system and method for one or more of the following purposes:

Offer a new system and method of SMS delivery making use of existing SMS interworking agreements of a sponsor operator; and Enforce SMS delivery agreements from a sending operator either direct or via SMS hub provider, using either Home IMSI (subscription identities of receiving operator) or Sponsored IMSI (subscription identities of sponsor operator).

BACKGROUND

To help the reader understand the description of the invention, the following abbreviations are provided:

| | |
|---|---|
| B-IMSI | International Mobile Subscriber Identity for party B |
| B-MSISDN | Mobile Subscriber ISDN (mobile telephone number) for party B |
| B-party IMSI | See B-IMSI |
| Destinee | Subscriber receiving the SMS (B-party MSISDN) |
| GT | Global Title (routable E.164 number, either a phone number or technical network element address) |
| HLR | Home Location Register (contains subscription and location info of mobile subscribers) |
| HLR-B | Home Location Register for party B |
| HLR GT | Home Location Register Global Title |
| Hub | Entity providing service interconnection between operators |
| Hub-Pfx | Hub prefix, few digits at the start of the GT indicating the hub |
| Home IMSI | Home International Mobile Subscriber Identity, i.e. IMSI provided by home network operator |
| Home B-IMSI | Home International Mobile Subscriber Identity for party B |
| Sponsored B-IMSI | Sponsored IMSI, from the sponsor operator's range, uniquely linked with a Home B-IMSI |
| IMSI | International Mobile Subscriber Identity |
| Dual IMSI | SIM based solution, where both a home and a sponsored IMSI are configured on the SIM card for the purpose of roaming |
| ISDN | Integrated Services Digital Network |
| MAP | Mobile Application Part |
| MNO | Mobile Network Operator |
| MNO A | Mobile Network Operator party A (sender) |
| MNO B | Mobile network Operator party B (receiver) |
| MNO S | Sponsor operator for SMS interworking purposes |
| MNO X | Sponsor operator for roaming purposes |
| MVNO | Mobile Virtual Network Operator (MNO operating without Radio Access network and spectrum license) |
| MNP | Mobile Number Portability |
| MSC | Mobile Switching Center |
| MSISDN | Mobile Subscriber ISDN (mobile telephone number) |
| Multi IMSI | SIM based solution, where multiple home and/or sponsored IMSI are configured on the SIM card |
| PXP | Portability prefix, nationally regulated prefix which indicates the receiving operator, where the number has been ported to |
| SCCP | Signaling Connection Control Part, network routing part of SS7 protocol stack, transport for MAP |
| SCCP Clg GT | Signaling Connection Control Part, calling Global Title |
| SCCP Cld GT | Signaling Connection Control Part, called Global Title |
| SIM | Subscriber Identity Module (contains subscriber IMSI) |
| SMSC | Short Message Service Center |
| SM-A | SMSC of party A (sender) |
| SMPP | Short Message Peer to Peer protocol (over IP) |
| SMS | Short Message Service |
| SMS hub | See SMS hub provider |
| SMS hub provider | Entity providing interconnection between operators for SMS, over SS7 or SMPP; in short "hub provider" or "SMS hub" |
| SMS i/w | SMS interworking, commercial and technical agreement so that subscribers of different mobile network operators can send SMS to each other |
| SMS MT | SMS Mobile Terminating, actual delivery of SMS after routing info has been obtained |
| SRI for SM request | Request to send Routing Info for Short Message, short SRI, to obtain routing info required for delivery of SMS |
| SRI for SM response | Answer message to SRI for SM request, providing routing info for delivery of SMS |
| SS7 | Signaling System nr7 |
| SS7 carrier | Entity providing interconnection between operators for SS7 signaling; in short "carrier" |

-continued

| | |
|---|---|
| STP | Signaling Transfer Point, mainly used for SCCP routing |
| VLR | Visitor Location Register |
| VMSC | Visited Mobile Switching Centre (where B-party is roaming) |
| WB | SMS Worldbridge |

In this application, the notions of Mobile Network Operator (MNO) as well as Mobile Virtual Network Operator (MVNO) are included in the acronym "MNO" for reasons of simplicity, unless specifically stated otherwise.

As a rule, below, unless otherwise specified, "MNO A" is used to denote the Mobile Network Operator of the sending subscriber (A-party) and "MNO B" is used to denote the Mobile Network Operator of the receiving subscriber (B-party).

Subscribers of one MNO can send SMS messages to subscribers of another MNO, provided the MNO of sending and receiving subscribers have an SMS interworking agreement in place.

Establishing SMS interworking agreements with other mobile network operators to enable the exchange of SMS messages between their respective subscribers, is a process that takes time and effort for any MNO. The set of SMS interworking agreements is below also called the "SMS footprint".

Various arrangements are possible to build up an SMS footprint.

A first known method consists of negotiating bilateral agreements directly with targeted MNO interworking partners. While this allows for direct SMS delivery between MNOs without involvement of third parties, each bilateral relation needs to be negotiated and managed separately. This is a costly and time-consuming process. Therefore this type of agreement is usually the domain of incumbent, large to very large MNOs, who have had time to build up their SMS footprint along with their roaming portfolio.

With the growing number of MNOs, especially in the MVNO space, even incumbent MNO cannot keep on expanding their SMS footprint with bilateral agreements. New entrants to the market require alternative methods as well.

A second known method offered by the market is SMS hub. SMS hub providers act as brokers between MNOs to setup bundles of SMS interworking relationships, taking care of technical and commercial interfaces. They can provide a global SMS footprint and figure out the cheapest delivery routes.

However, there are a number of drawbacks to using an SMS hub arrangement compared to bilateral agreements.

Although it is definitely a faster method to build an SMS footprint than the bilateral negotiation process, still all new relations need to get approval from the other MNO connected to the hub.

It is also very important for MNOs to keep SMS delivery balanced for cost control purposes. That means MNOs ideally receive the same amount of SMS from the hub as they send to it. This is a delicate balancing act.

In order to augment their coverage, SMS Hub providers have also established peering agreements with other alike SMS Hub providers. This inevitably leads to longer delivery paths and poorer quality which results in lower delivery success rates compared to the direct delivery path.

So while SMS hub does provide a faster alternative to building SMS footprint, it is still not ideal in terms of cost and time-to-market for new entrants. Negotiations with SMS hub providers themselves may prove difficult as new entrants usually cannot bring sufficient volumes to the table.

There is a need for providing a method and system that enables to build a large SMS footprint fast and efficiently.

Once the SMS interworking between sending and receiving operators MNO A and MNO B has been agreed, either bilateral or via hub, the end users of MNO A & B can ideally start exchanging SMS. But for the operator, there are some other pain points. Operators may, intentionally or unintentionally, select another delivery method than the one agreed to avoid termination costs, due to configuration errors etc.

One reason specifically leads to unintentional selection of the wrong SMS delivery method: mobile number portability. Mobile number portability had been introduced in 75 countries. Operators and hub providers may face problems to adhere to the agreed delivery method, simply because number portability data is only available on a national level, and access must be negotiated with each country individually. Some countries have regulations that prohibit the sale and distribution of number portability data to third (international) parties; for others it is a challenge to keep data up-to-date and even if the data is available, the cost of access may be prohibitive.

That implies mobile phone numbers (MSISDN) can be ported from the number range holder MNO to any other MNO in the same country. In other words, the destination operator cannot be directly derived from the MSISDN of the B-party anymore. Operators are not required to have knowledge about ported numbers outside of their own country, so they cannot be expected to take corrective action.

The result is that sending operators sometimes use direct (bilateral) SMS delivery where hub was agreed and/or vice versa. They might also select the wrong hub provider in case they have more than one.

This results in an increased failure rate of SMS delivery, because the receiving MNO does not recognize the sending MNO operator or SMS hub provider and rejects the delivery attempt. The SMS message is consequently never received which leads to a loss of revenue for all parties involved.

Even if the SMS message does get delivered, it may lead to imbalance with respect to the SMS hub provider, which leads to increased costs for receiving MNO B.

There is thus a need for an improved system and method for enforcing SMS interworking agreements that is able reduce the risk of SMS messages not being delivered, i.e. reduce the failure rate, as well as keep the SMS delivery balanced through SMS hub providers.

SUMMARY

The invention provides a system for transporting an SMS message from a sending MNO (MNO A) to a receiving MNO (MNO B) wherein the receiving MNO uses a sponsor MNO within the context of SMS interworking services and wherein the system comprises a component (WB) in the routing path between receiving MNO (MNO B) and sending MNO (MNO A), the component (WB) being arranged for:

receiving SRI for SM response sent by receiving MNO (MNO B), the SRI for SM response comprising an IMSI;

reading SMS routing information in SRI for SM response;

accessing data relating to the SMS interworking arrangement between sending MNO (MNO A) and receiving MNO (MNO B)

establishing, dependent on the data relating to SMS interworking arrangement between sending MNO (MNO A) and receiving MNO (MNO B), whether use of the sponsor MNO (MNO S) is required and if use of the sponsor MNO (MNO S) is required or preferred, amending SMS routing information data in SRI for SM response, wherein the component introduces itself as receiving MNO to the sending MNO using a GT address from the sponsor MNO (MNO S) and replaces the IMSI in the SRI for SM response with a Sponsored B-IMSI;

receiving the subsequent SMS MT request by the component and SMS MT response message(s), wherein the component (WB) maps in the SMS MT request and SMS MT response the sponsored GT addresses to/from the corresponding sending MNO or receiving MNO GT addresses, and replaces in the SMS MT request the Sponsored B-IMSI with the IMSI comprised in the SRI for SM response.

Preferably, if use of the sponsor MNO is not required, the system passes on the SRI for SM response transparently thereby not receiving the subsequent SMS MT request and SMS response messages.

The method according to the invention is a method for transporting an SMS message from a sending MNO (MNO A) to a receiving MNO (MNO B) wherein the receiving MNO uses a sponsor MNO (MNO S) within the context of SMS interworking services, comprising the following steps:

receiving by a component in the routing path between sending and receiving MNO SRI for SM response sent by receiving MNO (MNO B), the SRI for SM response comprising an IMSI;

reading SMS routing information in SRI for SM response;

accessing data relating to the SMS interworking arrangement between sending MNO (MNO A) and receiving MNO (MNO B)

establishing, dependent on the data relating to SMS interworking arrangement between sending MNO (MNO A) and receiving MNO (MNO B), whether use of the sponsor MNO (MNO S) is required and if use of the sponsor MNO (MNO S) is required, amending SMS routing information data in SRI for SM response, wherein the component introduces itself as receiving MNO to the sending MNO using a GT address from the sponsor MNO (MNO S) and replaces the IMSI in the SRI for SM response with a Sponsored B-IMSI;

receiving the subsequent SMS MT request by the component and SMS MT response message(s), wherein the component (WB) maps in the SMS MT request and SMS MT response the sponsored GT addresses to/from the corresponding sending MNO or receiving MNO GT addresses, and replaces in the SMS MT request the Sponsored B-IMSI with the IMSI comprised in the SRI for SM response.

This patent application proposes a novel system and method wherein use is made of established MNO SMS interworking agreements. The system and method of the invention allows any MNO to instantly adopt and cherry-pick on the SMS interworking portfolio of sponsor MNOs without the hassle of negotiating bilateral agreements or hub provider agreements.

Any receiving MNO B can make use of sponsor MNO within the context of SMS interworking services.

"Sponsor Mobile Network Operators" abbreviated "Sponsor MNOs" or even shorter as "sponsors" are typically incumbent mobile network operators who provide the following resources to a 3rd party such as e.g. the SS7 carrier of such an MNO B:

A technical E.164 number range for the purpose of impersonating mobile network identities (GT addresses) by and routing of the same to said 3rd party;

IMSI (E.212) sub-range for the purpose of impersonating mobile subscriber identities by and routing of the same to said 3rd party.

These resources are provided by the sponsor in the context of SMS interworking services. They are for the sole use of SMS interworking services as offered by the 3rd party and can therefore no longer be used for mobile network identities or subscriber identities by the sponsor MNO himself or any other party. The process of sponsoring may further include a number of commercial, technical and operational aspects including but not limited to network connectivity, routing, billing, clearing house activities, service level agreements etc all of which are negotiated and set up beforehand. This process can be repeated with multiple sponsors, as said 3rd party can negotiate similar configurations with many (incumbent) MNO worldwide.

The use of network and subscriber identities of a sponsor MNO S allows the receiving MNO to make instant use of the SMS footprint of MNO S. This is a great advantage in terms of time-to-market and cost-efficiently establishing a large SMS footprint.

In a preferred embodiment the component has or has access to or gains access to data relating to existing arrangements on SMS interworking between sending MNOs A and sponsor MNOs S and when such arrangements exist, amends, if needed or preferred, the SMS routing information in the SRI for SM response according to the preferences of (client) MNO B.

Existing arrangement(s) indicate whether there is already an established SMS interworking relation between sending MNO A and receiving MNO B and whether this established interworking relationship is direct or via hub.

This allows the WB component to check existing arrangements and thereby to enforce existing arrangements between MNO A and MNO B as well as to make use of the arrangements between MNO A and the sponsor MNO S when so desired by MNO B.

In an embodiment the component is arranged for checking whether one of the following arrangements applies:

Sending MNO A and receiving MNO B have a direct (bilateral) interworking arrangement (a)

Sending MNO A and receiving MNO B have an interworking arrangement via hub (b)

MNO A and MNO B have no interworking arrangement, whereby MNO B makes use of a sponsor MNO S direct (bilateral) interworking arrangement with MNO A (c) or MNO A and MNO B have no interworking arrangement, whereby MNO B makes use of a sponsor MNO S interworking arrangement with MNO A via hub (d)

and wherein the WB component amends the SRI for SM response in accordance with the applicable arrangement of the arrangements a-d.

In preferred embodiments more than one sponsor is used and the WB component chooses the sponsor network element addresses (GT) and sponsor subscriber identities (IMSI) based on the data in the SRI for SM response and the data on the arrangements and preferences set up.

The receiving MNO B may make use of a single sponsor MNO S or of more than one sponsor, MNO S1, MNO S2, MNO Sn. In preferred embodiments the component is arranged to choose the sponsor MNO Si. Depending on for instance the sending MNO a choice may be made as to the sponsor. Some sponsors may offer an excellent SMS footprint in a particular region, such as Europe, but less so for another region, such as Africa or the Far East, while for other sponsors the opposite may hold. The risk of failure of delivery may be reduced by choosing for a sending MNO from a particular region a sponsor that has the best SMS footprint in that particular region. The component may be provided with for instance a table linking a particular region for the sending MNO to a sponsor of choice.

Other possibilities are:
based on sending MNO A (if A1, select sponsor S1, if A2 select S2 etc).
based on roaming situation of B-party, e.g. if B-party is roaming in USA, select sponsor S1, else select S2.
based on combination of the above.

Furthermore, rates for different sponsors may depend on the region and/or country of the sending MNO and/or other factors such as the amount of business in a particular region or even the time of day. This setup can of course change over time as agreements and rates get renegotiated. Having the possibility to make a choice for the sponsor on for instance the region of origin of the sending MNO or other factors can provide advantages.

The system and method can be used in or for several transporting systems. It can use the SS7 system, but the invention is also and equally applicable to other systems for transporting SMS messages such as envisaged for 4G and 5G, where transport protocols may be different (Diameter or HTTP instead of SS7) but SRI and SMS MT operations are functionally the same.

The component can be arranged at the network of the receiving MNO, or at the carrier for the receiving MNO or at any position (such as a separate entity) as long as it receives the SRI for SM response.

In preferred embodiments the component is arranged for, also
receiving SRI for SM request sent by MNO A;
accessing data relating to the SMS interworking arrangement for MNO A;
in case the arrangement requires the use of a sponsor MNO S, amending the SRI for SM request wherein the WB introduces itself as sending MNO to MNO B using a GT address from MNO S; while passing on the SRI for SM request transparently otherwise;

Also receiving the SRI for SM request, the component thus being in the routing path for the SRI for SM request, has the advantage that, in case that there is a risk MNO B will not recognize MNO A and thereby rejecting the delivery, introduction of the component as the sending MNO S using a sponsored address is made possible, whereby the delivery failure rate can be reduced.

It is remarked that the advantage of the reduction in risk of delivery failure is always obtained by the above measure, i.e. putting a component in the routing path of the SRI for SM request and amending the SRI data wherein the wherein the component introduces itself as sending MNO to the receiving MNO using a sponsored address provides an advantage, independent of whether or not the component is also in the routing path of the SRI for SM response.

Simply put, with the component in the path of the SRI for SM request, the receiving MNO only sees sponsor GT identities which are known to the receiving MNO. This removes or at least reduces the risk of delivery failure by rejection by the receiving MNO.

It is remarked that this measure also allows the receiving MNO to dismiss any other to him unknown, GT identity. This has as an effect that any fraudulent GT identity can be easily dismissed, which provides up and above the already mentioned technical advantage of reduced failure rate the possibility of reducing or maybe even eliminating the risk of fraud by SSCP global title faking and/or making it easier to avoid SSCP global title faking fraud.

The combination of putting the component in both routing paths, i.e. from MNO B to MNO A and vice versa, i.e. reading and, if needed or useful, amending both the SRI for SM request and the SRI for SM response, is preferred.

The WB component is preferably positioned at a carrier of the receiving MNO B so the component is present in the routing path of the SRI for SM response or of both the SRI for SM request and SRI for SM response. For an SS7 system that would be the SS7 carrier of the MNO B.

Within the framework of the invention the data on arrangements can be provided to the component in various non-limiting manners, such as being realized as an internal database (internal to the component), external database, which the component accesses and queries when needed, look-up tables or any other means. The important aspect is that the data is available and used, though in various steps, depending on the conditions, as will be explained below, not all of the data need always be used.

Present known systems and methods do not provide means for making an analysis of SRI data in view of data on the mentioned arrangements and then amend the SRI data as may be useful to avoid one or more of the above problems. They also do not allow instantly adopting and cherry-picking on the existing SMS interworking portfolio of a sponsor MNO.

These and further aspects and advantages of the invention will be discussed more in detail hereinafter with reference to the disclosure of preferred embodiments, and in particular with reference to the appended Figures in which like reference numerals usually refer to like elements wherein:

DETAILED DESCRIPTION

Figure 1:
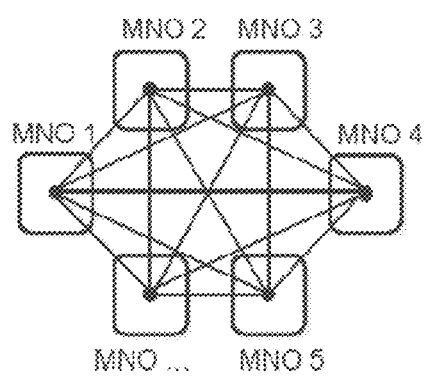
FIG. 1 illustrates bilateral arrangements between MNOs
Figure 2:
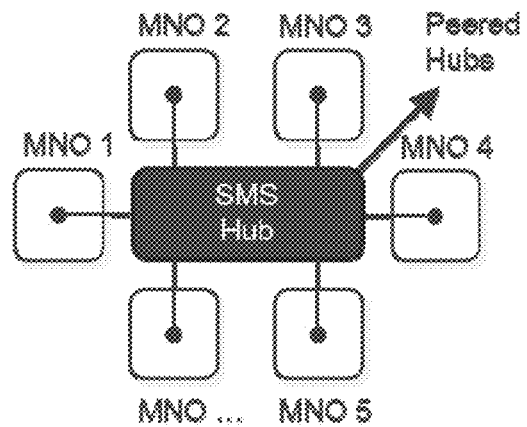
FIG. 2 illustrates hub arrangements

FIGS. 1 and 2 illustrate two established delivery methods: direct (bilateral) (FIG. 1) and via hub (FIG. 2). It can be safely assumed that most MNO have built up an SMS interworking portfolio (footprint) that is a mix of both types of relationships: e.g. direct with roaming partners and hub with the rest of the world.

Direct (bilateral) transport of SMS messages takes place over carriers, usually exclusively over SS7. The parties involved are MNO A (sending MNO), MNO B (receiving MNO) and their respective (international) SS7 carriers.

The SS7 carriers are responsible for SCCP routing, and provide SS7 interconnection. No specific, SMS related service, is required of them. They pass on the content of the messages unaltered.

It is remarked that in the below examples and figures the invention is illustrated in embodiments in which the SS7 transport system and method is used. This is not to be taken as restrictive. The system and method for transporting can be used in or for several transporting systems. The system and method of the invention can be applied in of for a SS7 system and method, but the invention is also and equally applicable to other systems and methods for transporting SMS messages such as for 4G and 5G, where transport protocols may be different (Diameter or HTTP instead of SS7) but SRI and SMS MT operations are functionally the same.

Figure 3:
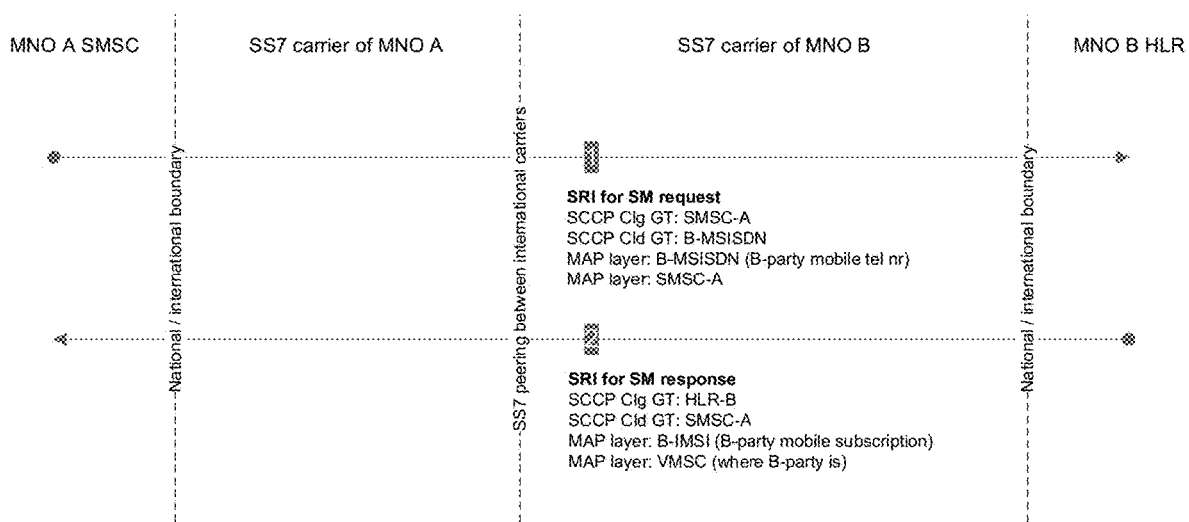
FIGS. 3 and 4 illustrate the delivery process for an SMS message in a bilateral arrangement
Figure 4:
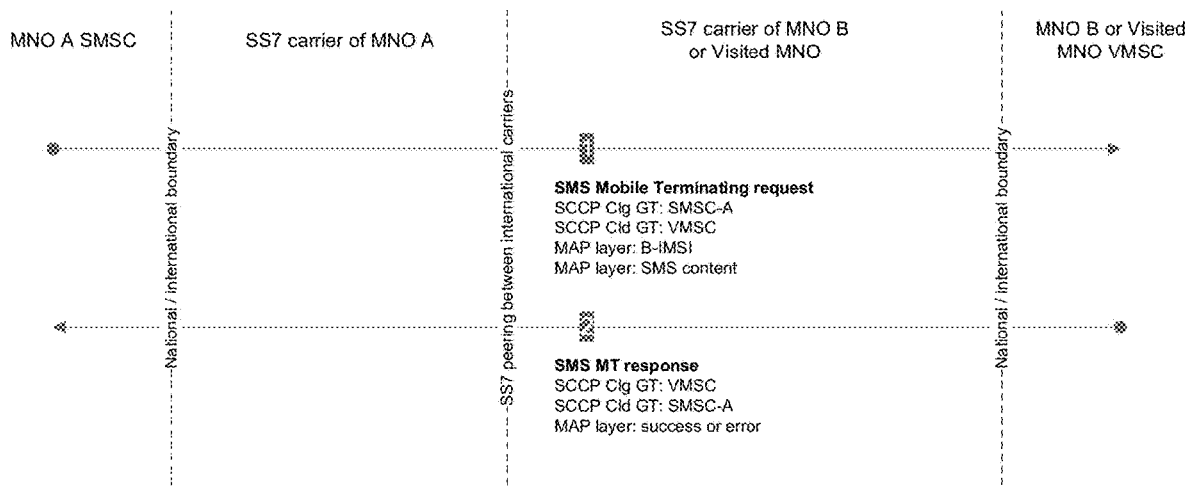

FIGS. 3 and 4 illustrate the delivery process for an SMS message in a bilateral arrangement between sending MNO A and receiving MNO B.

As shown in the message flows in FIGS. 3 and 4, the delivery process involves 2 steps:

Step I (FIG. 3): find out where the destinee (B-party) is. B may be roaming. This is achieved by the MAP operation "Send Routing Info for Short Message" abbreviated "SRI for SM". The SRI for SM request (1) is sent by MNO A's SMSC (Short Message Service Center) and routed on B-party's phone number (B-MSISDN). As such it arrives at MNO B's network and more specifically, the HLR (Home Location Register) where the destinee's subscription is managed. The HLR also keeps track of subscriber's roaming situation, via MAP mobility management procedures.

In the SRI for SM response (2), the B-party IMSI (International Mobile Subscriber Identity, i.e. the B-party's mobile subscription ID) as well as the MSC (Mobile Switching Centre) where the B-party is currently roaming, are provided. The latter is abbreviated VMSC, for Visited MSC. The IMSI is required by the VMSC to identify the subscriber and deliver the SMS.

The messages sent in step I this example are:

| 1. | 2. |
|---|---|
| SRI for SM request | SRI for SM response |
| SCCP Clg GT: SMSC-A | SCCP Clg GT: HLR-B |
| SCCP Cld GT: B-MSISDN | SCCP Cld GT: SMSC-A |
| Map Layer: B-MSISDN | Map Layer: B-IMSI |
| Map layer: SMSC A | Map layer: VMSC |

B-MSISDN is B-party mobile telephone nr; B-IMSI is B party mobile subscription identity; VMSC is where party B is roaming (can be at home or abroad).

Step II (FIG. 4): actual SMS delivery to the B-party. Once the SMSC of MNO A has found out the subscription ID of the B-party and where he can be reached (VMSC), the actual delivery can be done. This is achieved by the MAP operation "forward Short Message Mobile Terminating" abbreviated "SMS MT". The request is routed on SS7 to VMSC, including B-IMSI and SMS content (text). The response says whether the VMSC was able to deliver the SMS to the B-party or not.

The messages sent in step II in this example are:

| 1. | 2. |
|---|---|
| SMS MT (mobile terminating) request | SMS MT response |
| SCCP Clg GT: SMSC-A | SCCP Clg GT: VMSC |
| SCCP Cld GT: VMSC | SCCP Cld GT: SMSC-A |
| Map Layer: B-IMSI | Map Layer: success or error |
| Map layer: SMS content | |

Figure 5:
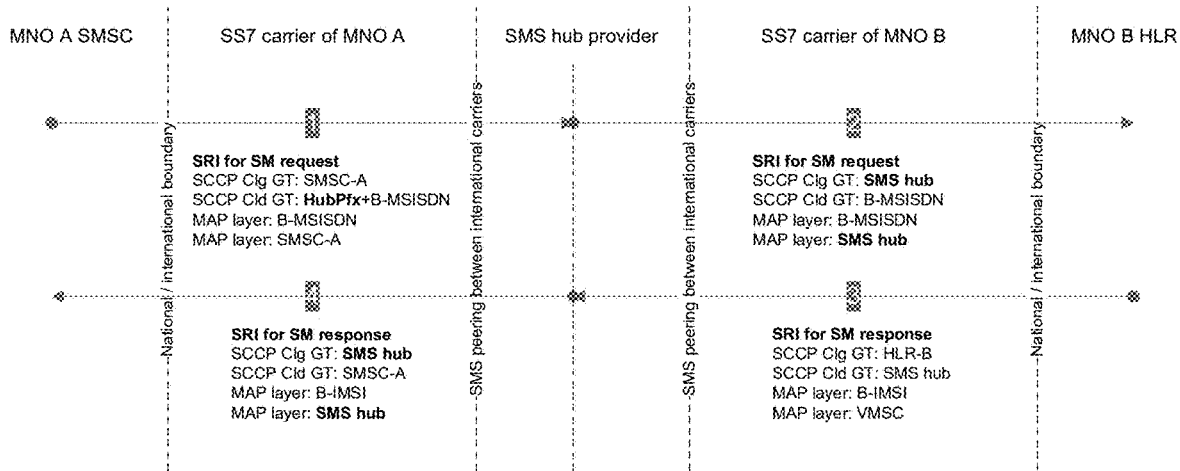
FIGS. 5 and 6 illustrates the delivery process for an SMS message in a hub arrangement
Figure 6:
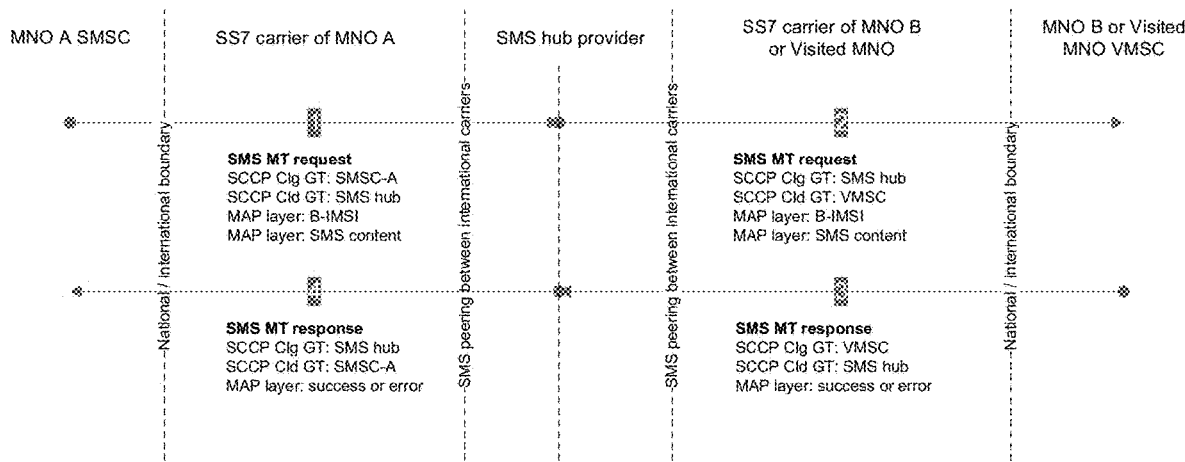

FIGS. 5 and 6 illustrate the delivery process for an SMS message in a hub service arrangement between sending MNO A and receiving MNO B.

In case of delivery via SMS hub providers, the transport between SMS hub and MNO is usually SS7, as for the bilateral case. For completeness sake, transport between SMS hub providers is on SMPP. Hub customers (MNO) expect ubiquitous SMS delivery service. The bigger the hub's community (set of MNO customers), the more attractive it is due to the "networking" effect. The process to build a community obviously takes time, and it's no surprise even the biggest hub players do not have full global coverage. As a result, SMS hub providers need to strike peering deals with each other in an effort to stitch together a global reach. As technical interface for peering, instead of SS7, SMPP was selected as protocol.

The result of peering is quite the labyrinth where one quickly looses track of all possible ways from A to B, sometimes with SMS travelling around the world to reach a neighbouring country, as hub providers are often on the prowl for the cheapest delivery rates. This goes a way to explain the poorer quality of service, measured in delivery success rates, compared to bilateral relations. Contrary to bilateral delivery, the SMS is not sent directly from MNO A to MNO B, but travels from MNO A to the hub provider, and then from the hub provider to MNO B.

Again the delivery process has 2 steps, both of them going via the hub provider.

Step I (FIG. 5): while the initial message is the same as for direct delivery, the difference is that this time it is not routed immediately to MNO B but instead to the SMS hub provider managing the A-B relation. This can be achieved by prefixing B-MSISDN with so-called hub prefix digits in the SCCP Cld (Called) GT, or any other scheme agreed with SS7 carrier of MNO A. The SMS hub terminates the request and starts a new one, this time to MNO B. It also replaces SMSC-A with its own GT address since MNO B doesn't deal directly with MNO A. Similarly, the response is handled by the hub. Towards MNO A, the hub will replace both HLR-B and VMSC with its own GT address to attract the subsequent SMS MT.

The messages sent in step I as illustrated in FIG. 5 in this example are:

| 1. | 2. |
|---|---|
| SRI for SM request | SRI for SM request |
| SCCP Clg GT: SMSC-A | SCCP Clg GT: SMS hub |
| SCCP Cld GT: hub pfx + B-MSISDN | SCCP Cld GT: B-MSISDN |
| Map Layer: B-MSISDN | Map Layer: B-MSISDN |
| Map layer: SMSC-A | Map layer: SMS hub |

-continued

| 3. | 4. |
|---|---|
| SRI for SM response<br>SCCP Clg GT: HLR-B<br>SCCP Cld GT: SMS hub<br>Map Layer: B-IMSI<br>Map layer: VMSC | SRI for SM response<br>SCCP Clg GT: SMS hub<br>SCCP Cld GT: SMSC-A<br>Map Layer: B-IMSI<br>Map layer: SMS hub |

Step II (FIG. 6): actual delivery of the SMS also happens via the hub Similar to the SRI for SMS dialog, also in the SMS MT dialog, network identities (on SCCP and MAP level) of MNO A are replaced by hub identities towards MNO B and vice versa.

While less straightforward than direct, bilateral delivery, this delivery method via hub also works regardless where the B-party might be roaming.

The messages in step II illustrated in figure in this example are:

| 1. | 2. |
|---|---|
| SMS MT request<br>SCCP Clg GT: SMSC-A<br>SCCP Cld GT: SMS hub<br>Map Layer: B-IMSI<br>Map layer: SMS content | SMS MT request<br>SCCP Clg GT: SMS hub<br>SCCP Cld GT: VMSC<br>Map Layer: B-IMSI<br>Map layer: SMS content |

| 3. | 4. |
|---|---|
| SMS MT response<br>SCCP Clg GT: VMSC<br>SCCP Cld GT: SMS hub<br>Map Layer: success or error | SMS MT response<br>SCCP Clg GT: SMS hub<br>SCCP Cld GT: SMSC-A<br>Map Layer: success or error |

Figure 7:
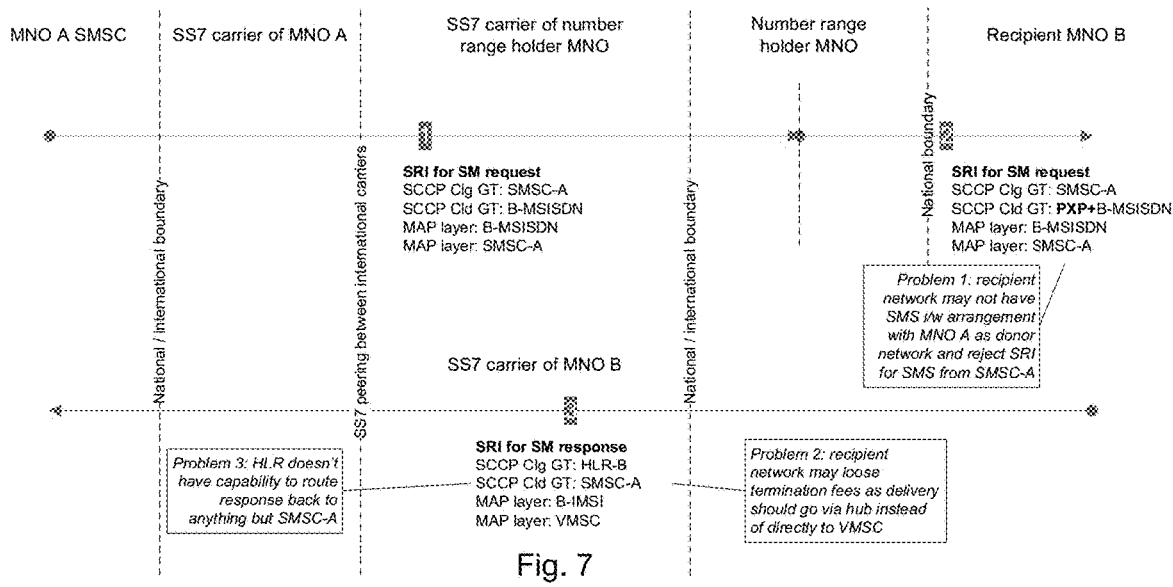
FIG. 7 illustrates problems that may occur with present methods

Although all seems in order as mentioned above, the sending MNO (MNO A) can, intentionally or not, revert to a delivery method that was not agreed with the receiving MNO (MNO B). While we can only speculate on MNO A's motives, there is at least one clear reason why, unintentionally, the wrong delivery method is chosen: number portability. A number of problems are illustrated in FIG. 7. The exemplary messages shown in FIG. 7 are:

| 1. | 2. |
|---|---|
| SRI for SM request<br>SCCP Clg GT: SMSC-A<br>SCCP Cld GT: B-MSISDN<br>Map Layer: B-MSISDN<br>Map layer: SMSC-A | SRI for SM request<br>SCCP Clg GT: SMSC-A<br>SCCP Cld GT: PXP + B-MSISDN<br>Map Layer: B-MSISDN<br>Map layer: SMSC-A |

| 3. |
|---|
| SRI for SM response<br>SCCP Clg GT: HLR-B<br>SCCP Cld GT: SMSC-A<br>Map Layer: B-IMSI<br>Map layer: VMSC |

Essentially the delivery method that is selected by MNO A for delivery of the SMS message to be sent to MNO B is based on the MSISDN of the receiving subscriber of MNO B, more specifically the official operator number range it belongs to. This identifies the number range holder MNO. For example, MSISDN starting with +32475 are considered as belonging to a large incumbent MNO (MNO C) in Belgium. MNO C is the range holder for this range of MSISDN. MNO C has ported out part of this range to MNO B. MNOs outside of Belgium have no obligation to be aware of Belgian MNP, so they will route the SRI for SM request always to the range holder, i.e. to MNO C. There also is no obligation for the international SS7 carrier(s) en route to send the SRI for SM request other than to the number range holder MNO C.

Suppose that MNO A has an arrangement for direct SMS delivery with the range holder (MNO C). MNO A also has an agreement with MNO B for SMS delivery via hub. Because MNO A thinks it is delivering SMS to the range holder (MNO C) it must opt for direct SMS delivery as dictated by their agreement. However, according to national portability rules, the range holder (in FIG. 7 called the donor network, since in the context of Number Portability, "donor" is often used to indicate the range holding operator where the subscriber has ported from, whereas the receiving operator is where the subscriber has ported to) finds out the number is ported out to MNO B and therefore the range holder MNO C must forward the SRI for SM request to the receiving operator MNO B on their national connection, as required per the national regulation.

The combination of international and national regulations leads to the message flow as shown in FIG. 7, for direct SMS delivery. The receiving MNO B has, however, a different arrangement, namely via hub, with MNO A, and this arrangement requires intervention of a hub provider. This is problem 1 in FIG. 7. MNO B receives from MNO A an SMS request via direct delivery, which is not according to the agreement it has with MNO A which requires intervention of a hub provider. If the receiving MNO B rejects the SRI for SM request at this stage, delivery of SMS to his (ported-in) subscribers will fail. For any player on the market, incumbent or new entrant, this can be a considerable percentage. The reverse can also happen, SMS is delivered via hub while direct delivery was agreed. It is remarked that although conflicting commercial agreements and regulations cause failure in delivery, the problem is something purely technical, namely failure of delivery.

Problem 2, also schematically indicated in FIG. 7 occurs if the receiving MNO B decides to allow the "redirected" SRI for SM request. In this case the SMS is delivered but at a higher cost than expected:

Direct delivery bypasses the intended hub path: balance of termination from and to the hub is disturbed, leading to higher hubbing costs (a hub needs to cover excess termination rates caused by unbalance between members of the hub community).

Hub delivery is triggered instead of the intended direct delivery: less than optimal path choice with possibly reduced delivery success rate and increased costs, again due to unbalance. Reduced delivery success is again a technical problem. Also there may be an increased risk for failed delivery because of the less than optimal choice of path, also a technical problem.

The wrong hub provider is triggered, in case MNO A has more than one provider. Again, balances are disturbed.

Problem 3 occurs if receiving B-party is roaming on a sponsor MNO X's roaming agreements and relies on a Dual IMSI type of service, where the SIM card of the B-party holds both Home B-IMSI as well as a roaming sponsor "Dual" IMSI. The latter is used in case when the B-party is roaming abroad. Note that this service is different from the sponsored SMS interworking service, as it is specifically used for roaming. For pure SMS interworking services, no IMSI other than the Home B-IMSI is required on the B-party's SIM card. The effect of Dual IMSI however, is that the SMS interworking agreements between MNO A and the roaming sponsor MNO X must be observed, which may again be different from the ones between MNO A and MNO B. Wherein in this application mention is made of Dual IMSI it is to be understood that Multi-IMSI is also possible and included in the description and/or figures.

In short, number portability causes serious issues for the receiving operator MNO B, who either has to absorb the revenue loss and/or accept less than satisfying failure rates or have all relations for a specific country managed by a single hub provider, which is rarely cost-efficient. Because sending MNO, number range holder MNO and their respective carriers and hub providers all act according to regulations, no change in behaviour can be expected from them or may not even be legally allowed. Also any given situation may quickly change due to changes in agreements.

Giving control to the receiving operator MNO B to rectify the delivery process is therefore paramount and would benefit incumbent operators as well as new entrants. The system and method of the invention is aimed to provide such control.

To Summarize:

Direct bilateral agreements are cumbersome and time consuming to establish.

Although SMS hub providers can offer a decent SMS footprint to new entrants quite fast, still members of the community must be open to do business with them, making sure volume balance is kept. This can be particularly tough for smaller players who cannot bring the required volumes to the table to achieve good rates. And as indicated before, SMS hub routes may not always provide the desired delivery success rate for all destinations.

Incumbent mobile network operators may have a huge SMS footprint outshining even the largest SMS hub providers thanks to the AA.19 SMS interworking agreement addendums to their vast portfolio of roaming agreements. While there are well-known methods to piggy-back on such an MNO's roaming agreements (Dual IMSI), these methods only cover outbound roaming services and do not relate to plain-and-simple delivery of SMS, regardless whether the destinee (B-party) is roaming abroad or at home.

The method and system of the invention introduce a method and system where the subscription identity of the B-party (B-IMSI) is altered to that of a sponsor MNO, making the footprint and underlying termination rates available to the receiving MNO.

Figure 8:
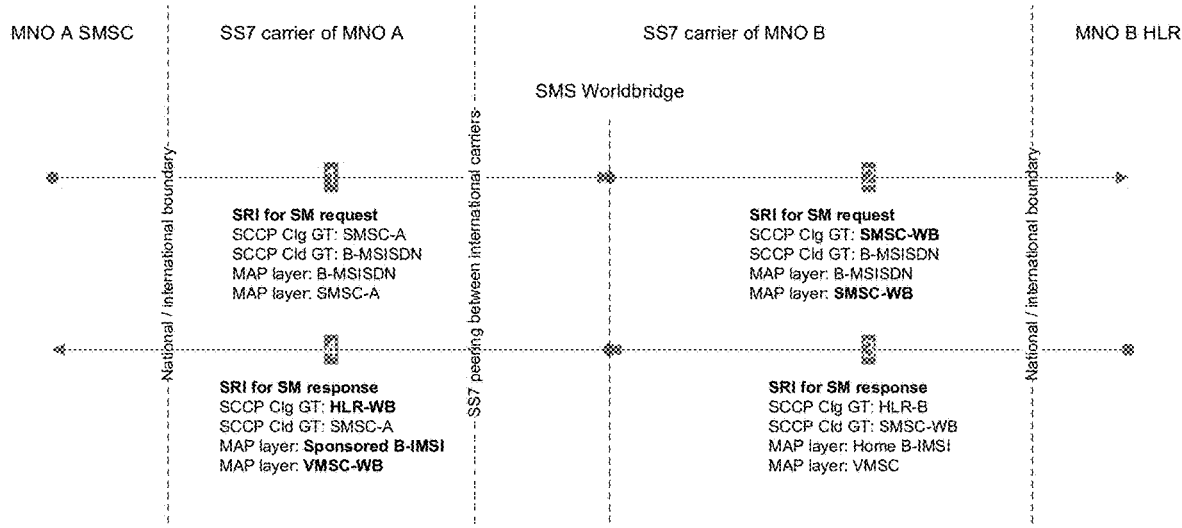
FIG. 8 illustrates an embodiment of a system and method according to the invention

FIG. 8 illustrates an embodiment of the invention.

The invention introduces a new functional element, in FIG. 8 named "SMS Worldbridge", or abbreviated "WB", that will replace network identities and subscription identities so that it appears as receiving MNO to sending MNO A, and as sending MNO to the actual receiving operator, MNO B. In the SRI for SM response, the component replaces the actual subscription identity of the B-party (Home B-IMSI) with a matching subscription identity of the SMS interworking sponsor (Sponsored B-IMSI). In the SMS MT request, the opposite mapping from Sponsored B-IMSI to Home B-IMSI is done.

The functional element could be positioned in the network of the receiving MNO B but most preferably it is positioned at a 3rd party who negotiates the sponsors' setup, for instance the SS7 carrier of the receiving MNO B.

The WB component is thus introduced in the path of the SMS transport from MNO A to MNO B, most preferentially in such a way that all messages involved, including the SRI for SM request, can be received by simple (SCCP) routing measures.

In FIG. 8 the new functional element is positioned in such a way: in this embodiment the new functional element, denoted as "SMS Worldbridge" or short "WB" is located at the SS7 carrier of MNO B, the selected carrier of MNO B. The carrier of MNO B has, as mentioned above, borrowed the required E.164 number range(s) from the sponsor operator, for use as network identities (HLR-WB, VMSC-WB and SMSC-WB) as well as E.212 IMSI sub-range(s) for use as subscriber identities.

The messages sent in the exemplary FIG. 8 are, wherein changes made by the new functional element WB are given in bold:

| 1. | 2. |
|---|---|
| SRI for SM request | SRI for SM request |
| SCCP Clg GT: SMSC-A | SCCP Clg GT: SMSC-WB |
| SCCP Cld GT: B-MSISDN | SCCP Cld GT: B-MSISDN |
| Map Layer: B-MSISDN | Map Layer: B-MSISDN |
| Map layer: SMSC-A | Map layer: SMSC-WB |

| 3. | 4. |
|---|---|
| SRI for SM response | SRI for SM response |
| SCCP Clg GT: HLR-B | SCCP Clg GT: HLR-WB |
| SCCP Cld GT: SMSC-WB | SCCP Cld GT: SMSC-A |
| Map Layer: Home-B-IMSI | Map Layer: Sponsored-B-IMSI |
| Map layer: VMSC | Map layer: VMSC-WB |

The use of network and subscription identities of the sponsor MNO S allows the receiving MNO B to make use of the SMS footprint of the sponsor MNO and thereby to instantly adopt and cherry-pick on the SMS interworking portfolio of a sponsor MNO without the hassle of negotiating bilateral or hub agreements. The party deploying the WB component is acting on behalf of MNO B.

Problem 1 of FIG. 7 is eliminated since to the receiving MNO B the component WB appears at the sending operator (due to changes made by WB in SRI for SM request) and the receiving MNO B will accept the request. Most importantly, in the SRI for SM response, the WB component replaces the actual subscription identity of the destinee (Home B-IMSI) with a subscription identity of the SMS interworking sponsor (Sponsored B-IMSI). In this way, sending MNO A is able to perform SMS delivery according to the SMS interworking arrangement with sponsor MNO S, and there doesn't need to be such an agreement with MNO B, which is the whole point of sponsored SMS interworking. MNO A could not definitively decide this on B-MSISDN alone, since MSISDN may be ported to other operators, and in some schemes, multiple MSISDN from different countries may be assigned to the same mobile subscription (IMSI).

Figure 9:
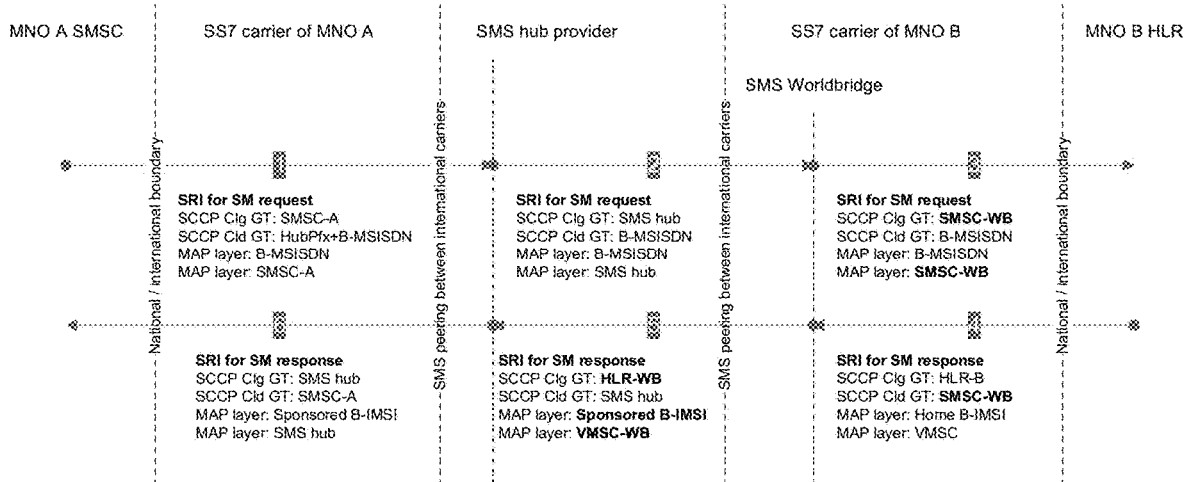
FIGS. 9 to 16 illustrate, for examples of the invention, some technical details and options of the system and method.

FIG. 9 illustrates a situation wherein MNO A has sent the SRI for SM request via hub to MNO B. This is the case where MNO A assumes that, based on B-MSISDN, the SMS interworking relation should go via hub, e.g. based on the SMS interworking agreements with number range holder MNO C.

The messages sent in this exemplary embodiment are:

| 1. | 2. | 3. |
|---|---|---|
| SRI for SM request | SRI for SM request | SRI for SM request |
| SCCP Clg GT: SMSC-A | SCCP Clg GT: SMS hub | SCCP Clg GT: SMSC-WB |
| SCCP Cld GT: Hub-pfx + B-MSISDN | SCCP Cld GT: B-MSISDN | SCCP Cld GT: B-MSISDN |
| Map Layer: B-MSISDN | Map Layer: B-MSISDN | Map Layer: B-MSISDN |
| Map layer: SMSC-A | Map layer: SMS hub | Map layer: SMSC-WB |

| 4. | 5. | 6. |
|---|---|---|
| SRI for SM response | SRI for SM response | SRI for SM response |
| SCCP Clg GT: HLR-B | SCCP Clg GT: HLR-WB | SCCP Clg GT: SMS hub |
| SCCP Cld GT: SMSC-WB | SCCP Cld GT: SMS hub | SCCP Cld GT: SMSC-A |
| Map Layer: Home-B-IMSI | Map Layer: Sponsored-B-IMSI | Map Layer: Sponsored-B-IMSI |
| Map layer: VMSC | Map layer: VMSC-WB | Map layer: SMS-hub |

Similar to the direct case of FIG. 8, the SMS Worldbridge replaces network identities so that it appears as sponsor MNO S to the hub, as well as to the receiving MNO B. Likewise, the subscriber identity is changed to that of the sponsor towards the hub and MNO A.

Once the SRI for SM request and SRI for SM response messages are sent delivery of the SMS message can be performed.

Figure 10:
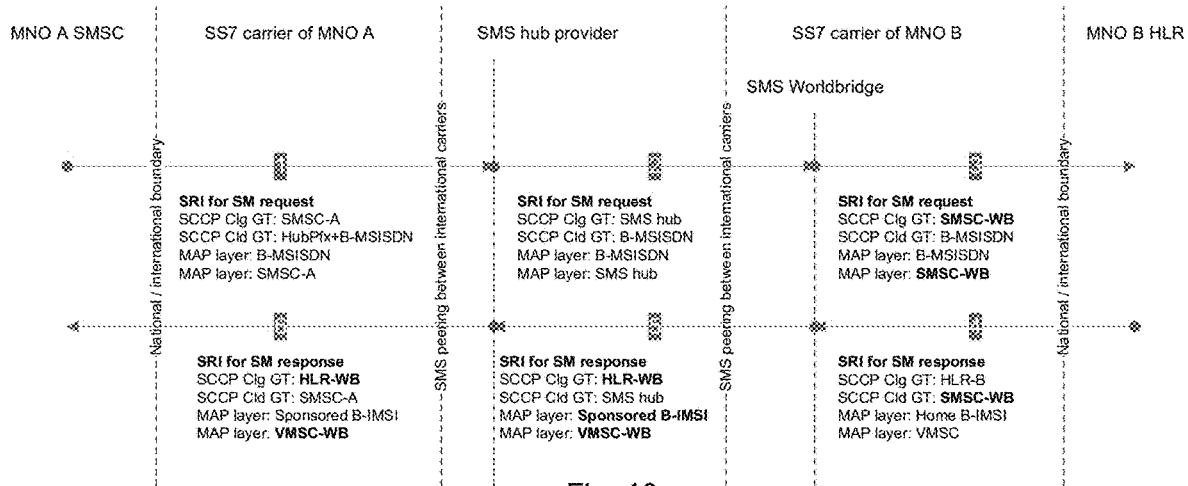

FIG. 9 actually shows the case where MNO A inadvertently selected the correct SMS hub provider already, the same as used for the relation between MNO A and sponsor MNO S. While this is entirely possible, this might not always be the case. FIG. 10 shows what needs to happen, when the Sponsored IMSI indicates to the hub provider that the hub provider doesn't manage this relationship: the hub provider preferably pulls out of the SMS delivery path by passing on the WB network identities (HLR-WB; VMSC-WB) unchanged.

The changes with respect to the flow in FIG. 9 are indicated are underlined:

the party deploying the WB component is acting on behalf of MNO B to enforce the desired SMS delivery methods.

Figure 11:
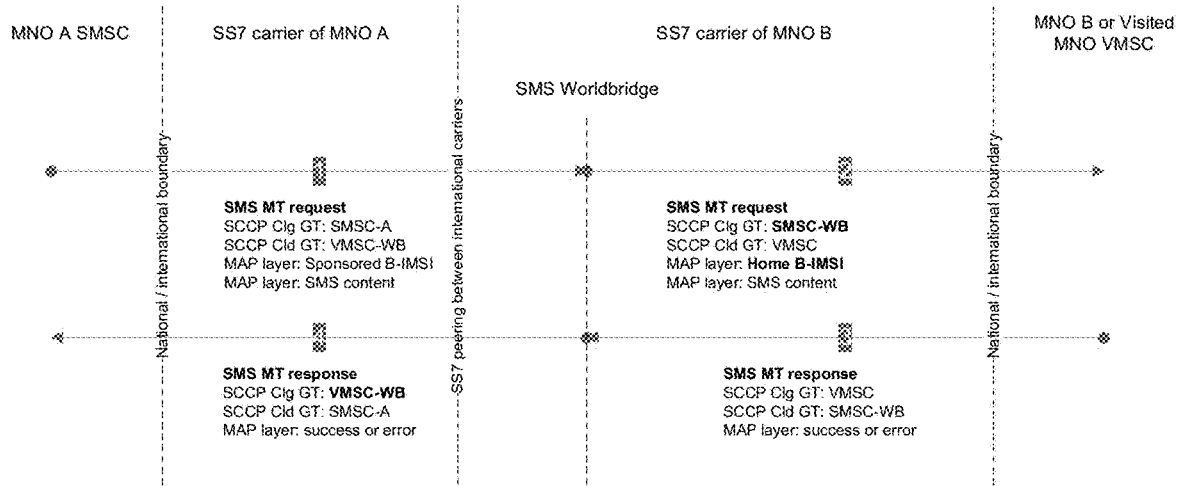
Figure 12:
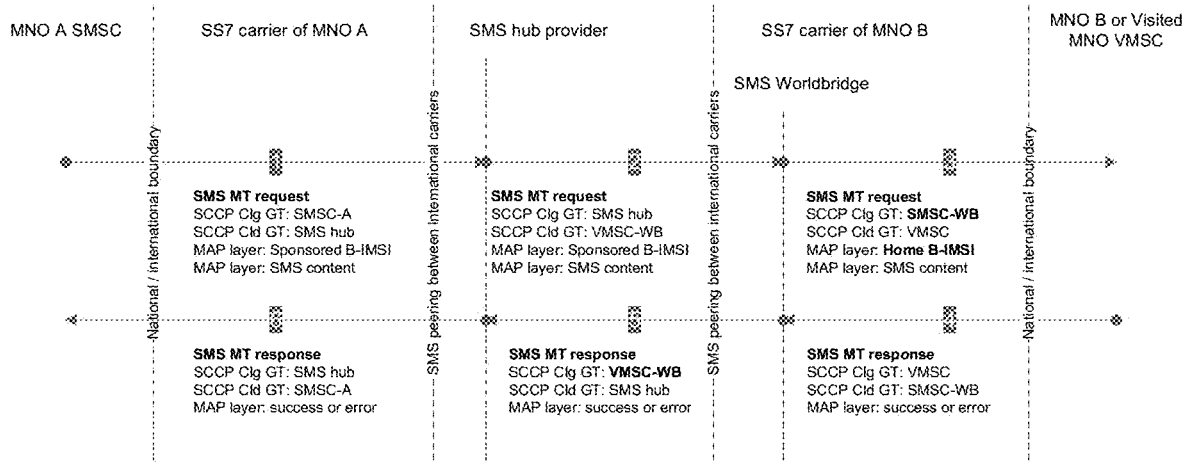

Examples of flows for SMS MT request and SMS MT response for a system and method of the invention is illustrated in FIGS. 11 and 12 wherein FIG. 11 illustrates a situation wherein the SMS interworking relation between MNO A and the sponsor MNO S (desired sponsor of MNO B) is direct and FIG. 12 wherein the SMS interworking relationship between MNO A and MNO S is via hub.

The messages sent in FIG. 11 are (as per example), where the mappings applied by the WB are indicated in bold:

| 1. | 2. |
|---|---|
| SMS MT request | SMS MT request |
| SCCP Clg GT: SMSC-A | SCCP Clg GT: SMSC-WB |
| SCCP Cld GT: VMSC-WB | SCCP Cld GT: VMSC |
| Map Layer: Sponsored B-IMSI | Map Layer: Home B-IMSI |
| Map layer: SMS content | Map layer: SMS content |

| 3. | 4. |
|---|---|
| SMS MT response | SMS MT response |
| SCCP Clg GT: VMSC | SCCP Clg GT: VMSC-WB |
| SCCP Cld GT: SMSC-WB | SCCP Cld GT: SMSC-A |
| Map Layer: success or error | Map Layer: success or error |

| 1. | 2. | 3. |
|---|---|---|
| SRI for SM request | SRI for SM request | SRI for SM request |
| SCCP Clg GT: SMSC-A | SCCP Clg GT: SMS hub | SCCP Clg GT: SMSC-WB |
| SCCP Cld GT: Hub-pfx + B-MSISDN | SCCP Cld GT: B-MSISDN | SCCP Cld GT: B-MSISDN |
| Map Layer: B-MSISDN | Map Layer: B-MSISDN | Map Layer: B-MSISDN |
| Map layer: SMSC-A | Map layer: SMS hub | Map layer: SMSC-WB |

| 4. | 5. | 6. |
|---|---|---|
| SRI for SM response | SRI for SM response | SRI for SM response |
| SCCP Clg GT: HLR-B | SCCP Clg GT: HLR-WB | SCCP Clg GT: <u>HLR-WB</u> |
| SCCP Cld GT: SMSC-WB | SCCP Cld GT: SMS hub | SCCP Cld GT: SMSC-A |
| Map Layer: Home-B-IMSI | Map Layer: Sponsored-B-IMSI | Map Layer: Sponsored-B-IMSI |
| Map layer: VMSC | Map layer: VMSC-WB | Map layer: <u>VMSC-WB</u> |

So far we have considered cases where the SRI for SM request was received by WB. This may not always be possible to arrange, nor is it actually needed when MNO B agrees not to reject any SRI for SM request even if it comes from "unknown" sources. In that case the upper part of FIGS. 8 and 9 does not take place. However the lower part, i.e. putting the SMS Worldbridge in the SRI for SM response path is always possible as MNO B is instructed to send any SRI for SM response to the WB component. Remember that In FIG. 11 the interworking relationship between MNO A and MNO S is direct, so MNO A sends the SMS MT request direct to the WB component and vice versa.

In FIG. 12 the SMS interworking relation between MNO A and the Sponsor MNO S goes via hub. Similar to the direct case, the SMS Worldbridge replaces network identities so that it appears as sponsor MNO S to the hub, as well as to the receiving MNO B. Likewise, the subscriber identity is changed to that of the sponsor towards the hub and MNO A.

The messages sent in FIG. 12 (as per example) are:

| 1. | 2. | 3. |
|---|---|---|
| SMS MT request<br>SCCP Clg GT: SMSC-A<br>SCCP Cld GT: SMS Hub<br>Map Layer: Sponsored B-IMSI<br>Map layer: SMS content | SMS MT request<br>SCCP Clg GT: SMS hub<br>SCCP Cld GT: VMSC-WB<br>Map Layer: Sponsored B-IMSI<br>Map layer: SMS content | SMS MT request<br>SCCP Clg GT: SMSC-WB<br>SCCP Cld GT: VMSC<br>Map Layer: Home B-IMSI<br>Map layer: SMS content |
| 4. | 5. | 6. |
| SMS MT response<br>SCCP Clg GT: VMSC<br>SCCP Cld GT: SMSC-WB<br>Map Layer: success or error | SMS MT response<br>SCCP Clg GT: VMSC-WB<br>SCCP Cld GT: SMS hub<br>Map Layer: Success or error | SMS MT response<br>SCCP Clg GT: SMS hub<br>SCCP Cld GT: SMSC-A<br>Map Layer: success or error |

It is remarked that all combinations are possible, i.e. the arrangements of FIG. 8 and FIG. 11, but also FIG. 8 and FIG. 12, FIG. 10 and FIG. 11 and FIG. 10 and FIG. 12. FIG. 9 is by definition to be combined with FIG. 12. Furthermore, as explained above, the initial SRI for SM request may have bypassed the WB element but the SRI for SM response is sent to the WB component. This third possibility can also be combined with the arrangements of FIG. 11 and FIG. 12.

Figure 13:
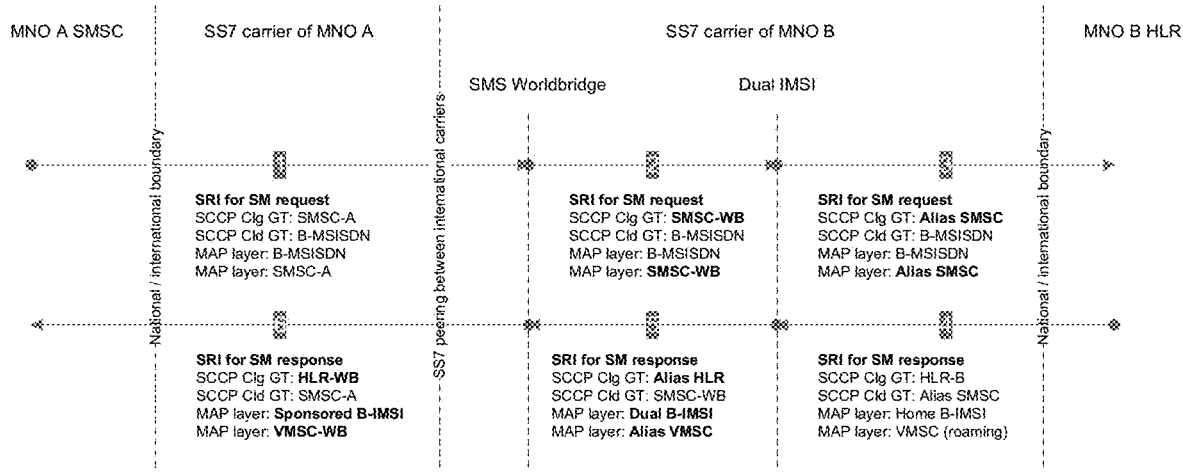
Figure 14:
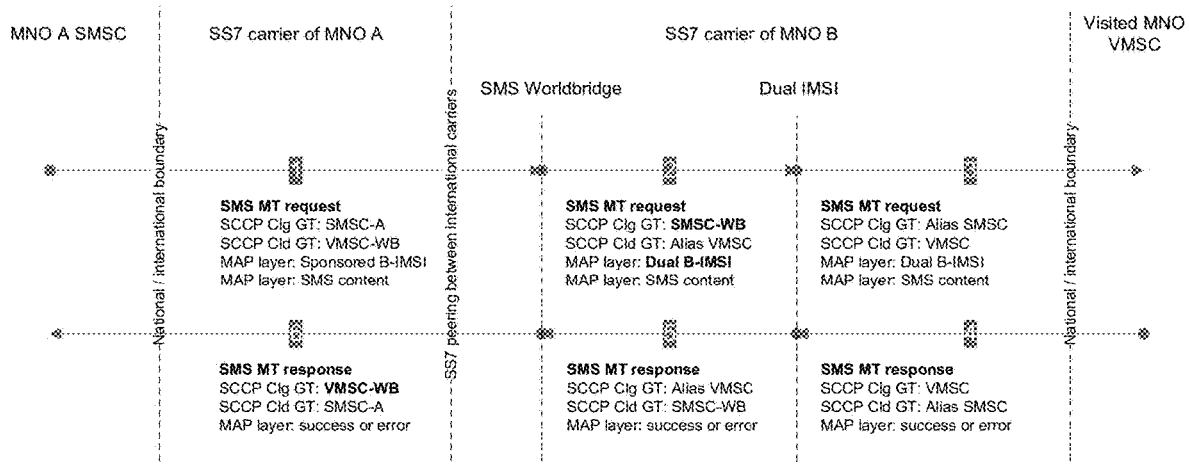

A somewhat more complex situation is illustrated in FIGS. 13 and 14.

What happens when MNO B has also adopted a Dual IMSI solution, piggy-backing on the roaming agreements of (yet another, roaming sponsor) MNO X, and the destinee (B-party) is indeed roaming on Dual IMSI? FIGS. 13 and 14 show the flows in this case, where we assume the Dual IMSI network element uses so-called "alias GT" from MNO X to perform its own network identities mapping. The "Dual B-IMSI" indicates the subscription identity with which the B-party subscriber is roaming. Note it can be entirely different from the Sponsor IMSI, used as identity towards MNO A.

Basically, SMS Worldbridge and Dual IMSI platforms can work independently from one another—both however require the cooperation of the carrier of MNO B.

The SRI for SM request is routed first to the SMS Worldbridge network element, and afterwards to the Dual IMSI network element. In case the SRI for SM request is missed, the reverse is done to the SRI for SM response. As both network elements change network and subscription identities, as shown in FIG. 13, notice that in this case the SMS Worldbridge now actually has to deal with SMS interworking agreements between MNO A and the roaming sponsor MNO X, not MNO B directly. It is therefore implied that SMS Worldbridge is preferably aware of SMS interworking agreements, not only of its immediate customers MNO B, but also—if applicable—their respective roaming sponsors.

The messages sent in the example of FIG. 13 are:

| 1. | 2. | 3. |
|---|---|---|
| SRI for SM request<br>SCCP Clg GT: SMSC-A<br>SCCP Cld GT: B-MSISDN<br>Map Layer: B-MSISDN<br>Map layer: SMSC-A | SRI for SM request<br>SCCP Clg GT: SMSC-WB<br>SCCP Cld GT: B-MSISDN<br>Map Layer: B-MSISDN<br>Map layer: SMSC-WB | SRI for SM request<br>SCCP Clg GT: Alias SMSC<br>SCCP Cld GT: B-MSISDN<br>Map Layer: B-MSISDN<br>Map layer: Alias SMSC |
| 4. | 5. | 6. |
| SRI for SM response<br>SCCP Clg GT: HLR-B<br>SCCP Cld GT: Alias SMSC<br>Map Layer: Home-B-IMSI<br>Map layer: VMSC (roaming) | SRI for SM response<br>SCCP Clg GT: Alias HLR<br>SCCP Cld GT: SMSC-WB<br>Map Layer: Dual-IMSI<br>Map layer: Alias VMSC | SRI for SM response<br>SCCP Clg GT: HLR-WB<br>SCCP Cld GT: SMSC-A<br>Map Layer: Sponsored-B-IMSI<br>Map layer: VMSC-WB |

In this embodiment the dual-IMSI is replaced with a Sponsored B-IMSI

SMS delivery follows the path set by the SRI for SM response messages, as illustrated in FIG. 14.

The messages in FIG. 14 are:

| 1. | 2. | 3. |
|---|---|---|
| SMS MT request<br>SCCP Clg GT: SMSC-A<br>SCCP Cld GT: VMSC-WB<br>Map Layer: Sponsored B-IMSI<br>Map layer: SMS content | SMS MT request<br>SCCP Clg GT: SMSC-WB<br>SCCP Cld GT: Alias VMSC<br>Map Layer: Dual B-IMSI<br>Map layer: SMS content | SMS MT request<br>SCCP Clg GT: Alias SMSC<br>SCCP Cld GT: VMSC<br>Map Layer: Dual B-IMSI<br>Map layer: SMS content |

| 4. | 5. | 6. |
|---|---|---|
| SMS MT response | SMS MT response | SMS MT response |
| SCCP Clg GT: VMSC | SCCP Clg GT: Alias VMSC | SCCP Clg GT: VMSC-WB |
| SCCP Cld GT: Alias SMSC | SCCP Cld GT: SMSC-WB | SCCP Cld GT: SMSC-A |
| Map Layer: success or error | Map Layer: Success or error | Map Layer: success or error |

In this embodiment the Sponsored B-IMSI is replaced with the dual-IMSI

While having a choice of delivery methods available, it is important to make sure that chosen delivery methods agreed upon commercially can also be enforced technically. The key of the solution to control the SMS delivery method, is the SRI for SM response message.

The "SMS Worldbridge" network component introduced above, which is in preferred embodiments located at the SS7 carrier of MNO B, is guaranteed to capture the SRI for SM response regardless of how the SRI for SM request was routed. This is true because of the simple fact that the response must come from MNO B, and MNO B uses his SS7 carrier to transport any international SS7 traffic.

It can be difficult to enforce SMS delivery on an SMS hub because the latter can be bypassed. Nor is it the task of a hub provider to negotiate sponsored SMS interworking. The SMS Worldbridge component could be placed in MNO B's network but such a setup is less scalable and is also economically less favourable: a 3rd party such as an SS7 carrier is much better placed to bundle the volumes of various MNOs B and negotiate sharp rates with prospective sponsors. In other words a carrier can offer those functions more economically, as he can provide these services to multiple operators at once.

Delivery can be unsponsored when there is already an interworking arrangement between MNO A and MNO B, or sponsored when there is not. Existing arrangement(s) indicate whether there is already an established SMS interworking relation between sending MNO A and receiving MNO B and whether this established interworking relationship is direct or via hub.

This allows the WB component to check existing arrangements and thereby to enforce them between MNO A and MNO B as well as to make use of the portfolio of a sponsor MNO S when so desired by MNO B.

Figure 15:
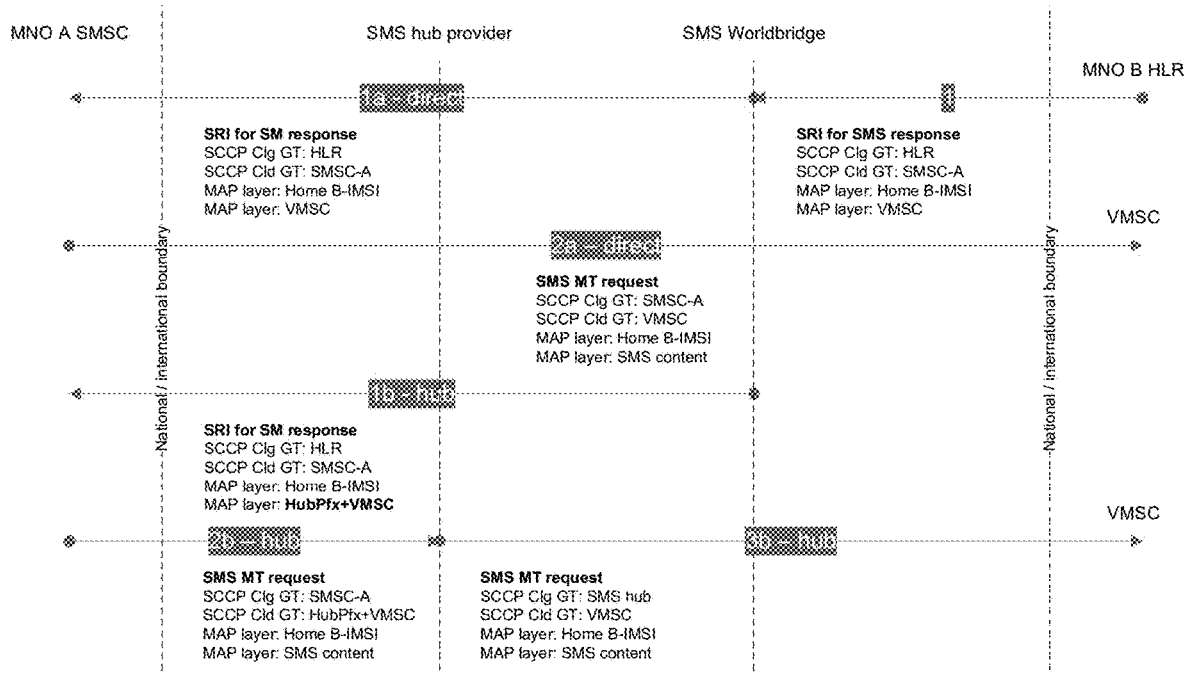
Figure 16:
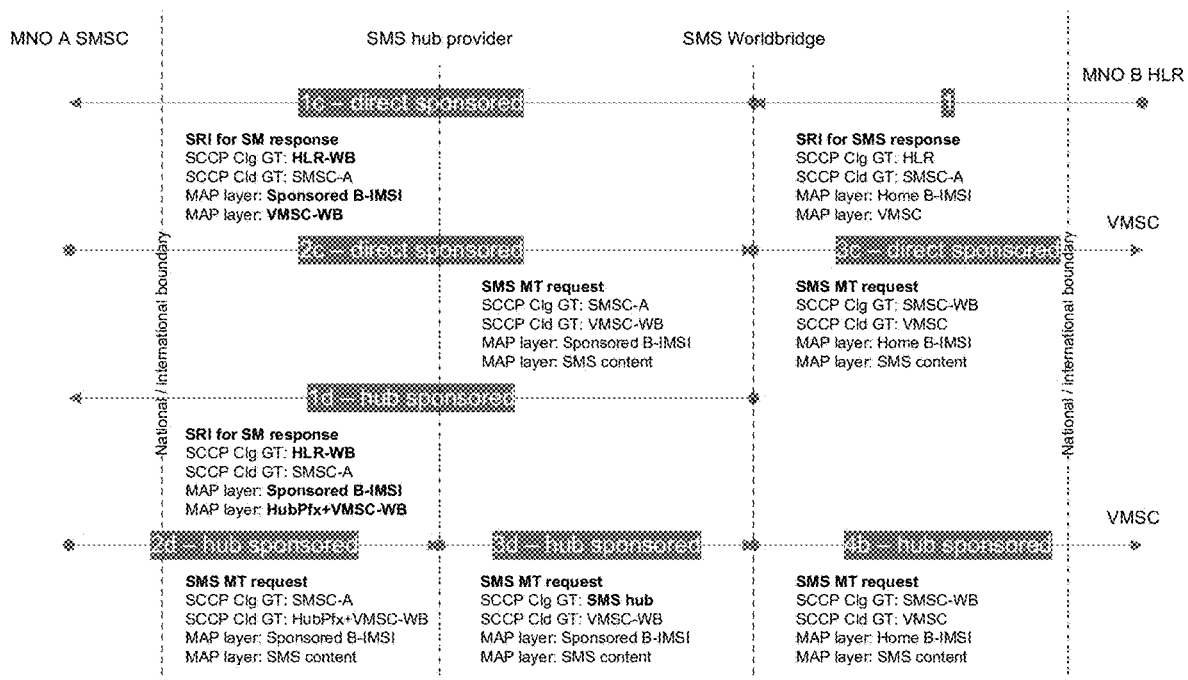

FIG. 15 shows the technical details of the control method for the unsponsored cases, while FIG. 16 shows them for the sponsored cases.

The messages are, in principle, as follows—assuming worst case where SRI for SM was not received: FIG. 15:

| 1. | 1a. direct | 2a direct |
|---|---|---|
| SRI for SM response | SRI for SM response | SMS MT request |
| SCCP Clg GT: HLR | SCCP Clg GT: HLR | SCCP Clg GT: SMSC-A |
| SCCP Cld GT: SMSC-A | SCCP Cld GT: SMSC-A | SCCP Cld GT: VMSC |
| Map Layer: Home-B-IMSI | Map Layer: Home-B-IMSI | Map Layer: Home-B-IMSI |
| Map layer: VMSC | Map layer: VMSC | Map layer: SMS content |
| 1b hub | 2b hub: | 3b. |
| SRI for SM response | SMS MT request | SMS MT request |
| SCCP Clg GT: HLR | SCCP Clg GT: SMSC-A | SCCP Clg GT: SMS hub |
| SCCP Cld GT: SMSC-A | SCCP Cld GT: hubpfx + VMSC | SCCP Cld GT: VMSC |
| Map Layer: Home-B-IMSI | Map Layer: Home-B-IMSI | Map Layer: Home-B-IMSI |
| Map layer: hubpfx + VMSC | Map layer: SMS content | Map layer: SMS content |

FIG. 16:

| 1. | | |
|---|---|---|
| SRI for SM response | | |
| SCCP Clg GT: HLR | | |
| SCCP Cld GT: SMSC-A | | |
| Map Layer: Home-B-IMSI | | |
| Map layer: VMSC | | |
| 1c direct sponsored. | 2c. direct sponsored | 3c. direct sponsored |
| SRI for SM response | SMS MT request | SMS MT request |
| SCCP Clg GT: HLR-WB | SCCP Clg GT: SMSC-A | SCCP Clg GT: SMSC-WB |
| SCCP Cld GT: SMSC-A | SCCP Cld GT: VMSC-WB | SCCP Cld GT: VMSC |
| Map Layer: Sponsored-B-IMSI | Map Layer: Sponsored-B-IMSI | Map Layer: Home-B-IMSI |
| Map layer: VMSC-WB | Map layer: SMS content | Map layer: SMS content |
| 1d hub sponsored | 2d hub sponsored | 3d hub sponsored |
| SRI for SM response | SMS MT request | SMS MT request |
| SCCP Clg GT: HLR-WB | SCCP Clg GT: SMSC-A | SCCP Clg GT: SMS hub |

| | | |
|---|---|---|
| SCCP Cld GT: SMSC-A | SCCP Cld GT: hubpfx + VMSC-WB | SCCP Cld GT: VMSC-WB |
| Map Layer: Sponsored-B-IMSI | Map Layer: Sponsored-B-IMSI | Map Layer: Sponsored-B-IMSI |
| Map layer: hub pfx + VMSC-WB | Map layer: SMS content | Map Layer SMS content |

| 4d hub sponsored |
|---|
| SMS MT request |
| SCCP Clg GT: SMSC-WB |
| SCCP Cld GT: VMSC |
| Map Layer: Home-B-IMSI |
| Map layer: SMS content |

The B-party HLR responds as usual, with B-IMSI and VMSC as routing info parameters. SS7 carrier of MNO B knows MNO B requires control of SMS delivery method, as per the commercial agreements with MNO B. Therefore the response is routed to the SMS Worldbridge WB component positioned there.

This WB component is, in preferred embodiments, aware of relevant information pertaining to MNO B, by means of preferably provisioning:

a. Required method of SMS delivery with sending MNO A: direct or via hub provider (see FIG. 15)

b. Whether sponsored subscription identity (IMSI) is to be used towards sending MNO A (FIG. 16)

c. Whether, in case of outbound roaming B-party, the relation with the visited network (VMSC) is based on Home or Dual IMSI (combine with FIGS. 13 and 14, with Dual IMSI element included in the SMS delivery path between WB and VMSC).

The options regarding to MNO A give rise to different outcomes as illustrated in FIGS. 15 and 16, while the relation with the visited network, in case of B-party roaming, affects the way VMSC is presented to MNO A. The WB component changes the SRI data in accordance with the information it has based on commercial agreements and, when applicable, sponsor's SMS footprint.

In the SMS MT step, the SMS will be delivered as programmed in the SRI for SMS response as follows.

a. If the SMS interworking relation between MNO A and B is bilateral, then direct SMS delivery to the VMSC happens. (FIG. 15, direct 1*a* and 2*a*). WB doesn't change the SRI for SM response, and SMS MT is sent directly to the VMSC. Note that if the SRI for SM came from a hub provider, by evaluating the B-IMSI, the hub provider can also transparently pass on the SRI response, i.e. without using its own SMS hub identity.

b. If the SMS interworking relation between MNO A and B is via hub, then SMS MT delivery happens via SMS hub e.g. using a commonly adopted routing mechanism with a specified, unique hub prefix (which belongs to the official number range of the hub provider in question). There is no limitation for MNO B to have only a single hub provider, support for multiple providers is simply part of the commercial agreement settings. (FIG. 15, 1*b*, 2*b*, 3*b*). WB manipulates the VMSC by adding a hub prefix to it. This, or any other mechanism indicated by the SMS hub provider, makes sure the subsequent SMS MT is delivered via the hub.

c. If MNO B has adopted sponsored SMS delivery, and the agreement between sponsor MNO S and MNO A is bilateral, then the SMS is delivered via SMS Worldbridge to map sponsored (-WB) identities to real ones and vice versa. (FIG. 16, 1*c*, 2*c*). This time WB adapts network and subscription identities. Subsequent delivery then also passes via the WB element.

d. If MNO B has adopted sponsored SMS delivery, and the agreement between sponsor MNO S and MNO A is via hub, then the SMS is delivered via hub (e.g. by routing on hub prefix). Note that the SMS hub provider is in principle the sponsor's, so MNO B has to allow termination from this provider. This may be a drawback of sponsored SMS delivery, but for new entrants, having instant coverage far outweighs the side-effect of being tied to the sponsor's hub provider(s). From the hub, the SMS is delivered via SMS Worldbridge mapping sponsored (-WB) identities to real ones and vice versa. (FIG. 16. 1*d*, 2*d*, 3*d*, 4*d*). WB replaces VMSC with a sponsored identity and then adds a hub prefix. Also IMSI is mapped. Subsequent delivery passes via hub and then the WB element.

The WB component thus controls the delivery such that it complies with all relevant agreements and arrangements.

In short, the system and method of the invention may be characterized as follows:

In a system and method for transporting SMS messages between sending MNO and receiving MNO, wherein the receiving MNO uses a sponsor, a component (WB) is provided.

The component is in the routing path between the sending MNO and the receiving MNO, with the possible exception of SRI for SM request. The component (WB) manages and enforces the proper SMS delivery methods to the receiving MNO by introducing itself in the SRI for SM request as a sending party, using a sponsored network entity ((SMSC-WB), and/or introducing itself in the SRI for SM response as a receiving party using a sponsored network identity (VMSC-WB, HLR-WB). The component handles, when it has introduced itself in the SRI for SM response, the SMS MT request and response message(s) using sponsored network (technical E.164) and subscription (IMSI) identities. The component may further gather information relating to SMS interworking agreements between the sending MNO A, and receiving MNO B or his SMS interworking sponsor MNO S, as well as any Dual or Multi IMSI roaming agreements of the MNO B. The component is preferably capable of using the gathered information for amending data in the SRI for SM request and/or SRI for SM response and/or SMS MT request and/or SMS MT response.

Various data sets may be involved and present in or accessed by the component WB or by a part of the component:

Data set 1: data on Sponsors.

This may include knowledge of or access to commercial SMS interworking agreements of the sponsor MNO or sponsor MNOs, if there are more than one, with other MNOs. Sponsors are preferably pre-negotiated with provider of the component. This provides the sponsored SMS footprint or SMS footprints.

Data set 2: data on Clients, i.e. on receiving MNO B. The receiving MNO B is a client of the WB component.

This may include knowledge of or access to commercial SMS interworking agreements of receiving MNOs, or their preferred sponsor, vis-à-vis other MNOs.

Data set 3: additional Client information (optional)

preference of how to deal with SRI request, when received by WB provider: apply changes as described in the pictures or pass on transparently. Since the latter is trivial, no pictures on that.

knowledge of any dual/multi-imsi roaming agreements of client MNOs, more specifically the SMS i/w agreements of the roaming imsi provider MNOs (dubbed MNO X).

The data sets may be present in the component WB or any part of the component or accessible by said component in any suitable form such as a table, a matrix etc.

The data may be simple such as for instance a look-up table which lists the sending MNO A for which use of the sponsor or which sponsor, if more than one sponsor is possible, is required or preferred and/or with which MNO A there are bilateral arrangements.

It may also be more complicated if for instance for various regions or time various rates apply so that for various regions or times a different sponsor is to be used.

Now, the present invention has here above been disclosed with reference to preferred embodiments thereof. Persons skilled in the art will recognize that numerous modifications and changes may be made thereto without exceeding the scope of the appended Claims. In consequence, the embodiments should be considered as being illustrative, and are not meant to exclude alternative embodiments from the invention. Specific structural and functional details disclosed herein are not to be interpreted as limiting but merely as a basis for the claims and as a representative basis for enabling someone skilled in the art to employ the present invention in a variety of manners. No restriction should be construed from those embodiments, other than as have been recited in the Claims.

For Instance:

In the figures a sponsor is used. In preferred embodiments more than one sponsor is used and the WB component chooses the sponsor addresses and sponsor identities based on data in the SRI for SM response and/or data on arrangements between the receiving MNO and the sponsor MNOs.

The terms "comprises", "comprising", "includes", "including" and "having" as used herein, are to be construed as being inclusive and open ended, and not exclusive. Specifically, when used in this specification including claims, the terms "comprises", "comprising", "includes", "including" and "having" and variations thereof mean that specified features, steps or components are included. These terms are not to be interpreted to exclude the use of other features, steps or components or subcomponents.

The phrase "X and/or Y" as used herein, is meant to be interpreted as "one or both of X and Y" wherein X and Y are any word, phrase, or clause. The term "X or Y" does not exclude, unless specifically stated so, or necessary for technical reasons X and Y.

The terms "configured to" or "arranged to" shall be construed as non-limiting, i.e. they do not preclude the item or items they refer to from having other features or functions.

Functional elements may be in the form of soft-ware or hardware and/or any combination thereof.

A functional element may be distributed or comprising sub-elements for performing subtasks.

So, for instance, the WB component may comprise various parts or subparts to perform specific tasks. As an example, the WB component may comprise a receiver part for receiving the SRI for SM response sent by receiving MNO (MNO B), a reader part for reading SMS routing information in SRI for SM response, a part for amending data; "introduction as a sending MNO" may mean that a part of the WB component is introduced as the sending MNO, which part of the WB component thereupon receives the subsequent SMS MT request and SMS MT response message(s), Parts of the WB component need not be physically at the same position or location.

The invention claimed is:

1. A system for transporting a short message service (SMS) message from a sending mobile network operator (MNO) to a receiving MNO wherein the receiving MNO uses a sponsor MNO within the context of SMS interworking services and wherein the system comprises a component in the routing path between the receiving MNO and the sending MNO, the component being arranged for:

receiving an SRI for SM response sent by the receiving MNO, the SRI for SM response comprising an international mobile subscriber identity (IMSI);

reading SMS routing information in the SRI for SM response;

accessing data relating to an SMS interworking arrangement between the sending MNO and the receiving MNO;

establishing, dependent on the data relating to the SMS interworking arrangement between the sending MNO and the receiving MNO, whether use of the sponsor MNO is required or preferred; and when use of the sponsor MNO is required or preferred, generating an amended SRI for SM response by amending SMS routing information data in the SRI for SM response, wherein the component introduces itself as the receiving MNO to the sending MNO using a Global Title (GT) address from the sponsor MNO and replaces the IMSI in the SRI for SM response with a Sponsored B-IMSI, and sending the amended SRI for SM response to the sending MNO; and when use of the sponsor MNO is not required, passing on the SRI for SM response transparently; and receiving from the sending MNO a subsequent SMS mobile terminating (MT) request by the component and from the receiving MNO one or more SMS MT response messages, wherein the component maps in the SMS MT request and the one or more SMS MT response messages the sponsored GT addresses to/from the corresponding sending MNO or receiving MNO GT addresses, and replaces in the SMS MT request the Sponsored B-IMSI with the IMSI comprised in the SRI for SM response.

2. System as claimed in claim 1, wherein, when the IMSI comprised in the SRI for SM response is a home-IMSI, the component is arranged for replacing the home-IMSI with the sponsored B-IMSI and vice versa.

3. System as claimed in claim 1, wherein, when the IMSI comprised in the SRI for SM response is a dual-IMSI or multi-IMSI, the component is arranged for replacing the dual-IMSI or multi-IMSI with the sponsored B-IMSI and vice versa.

4. System as claimed in claim 1, wherein the component is arranged for assessing data relating to existing arrangements on SMS interworking between the sending MNO and the sponsor MNO and to preferences of the receiving MNO and when an arrangement between the sending MNO and the sponsor MNO exists, amending the SMS routing information in the SRI for SM response according to the preferences of the receiving MNO.

5. System as claimed in claim 1, wherein the component is arranged for checking the received SRI for SM response whether one of the following arrangements applies:
   a) the sending MNO and the receiving MNO have a direct, bilateral interworking arrangement;
   b) the sending MNO and the receiving MNO have an interworking arrangement via a hub;
   c) the sending MNO and the receiving MNO have no interworking arrangement, whereby the receiving MNO makes use of a direct, bilateral interworking arrangement of the sponsor MNO with the sending MNO; or
   d) the sending MNO and the receiving MNO have no interworking arrangement, whereby the receiving MNO makes use of a interworking arrangement of the sponsor MNO with the sending MNO via the hub;
   and wherein the component amends the received SRI for SM response in accordance with the applicable arrangement of the arrangements a)-d).

6. System as claimed in claim 1, wherein more than one sponsor MNO is used by the receiving MNO and the component is arranged for selecting one of the more than one sponsor MNO, and the corresponding sponsored GT addresses and sponsored B-IMSI, based on the data in the SRI for SM response and the data on the arrangements and preferences set up.

7. System as claimed in claim 1 wherein the component is arranged for:
   receiving the SRI for SM request sent by the sending MNO;
   accessing data relating to the SMS interworking arrangement between the sending and the receiving MNO;
   establishing, dependent on the data relating to the SMS interworking arrangement between the sending MNO and the receiving MNO, whether use of the sponsor MNO is required or preferred and
   when use of the sponsor MNO is required or preferred, amending the SRI for SM request wherein the component introduces itself as the sending MNO to the receiving MNO using the GT address from the sponsor MNO and replaces the IMSI in the SRI for SM response with a Sponsored B-IMSI; and
   when use of a sponsor MNO is required, not passing on the SRI for SM request transparently.

8. System as claimed in claim 1 wherein the system is arranged for using the SS7 system or the 4G or the 5G system.

9. System as claimed in claim 1 wherein the component is arranged at the network of the receiving MNO, or at the carrier for the receiving MNO.

10. A method for transporting a short message service (SMS) message from a sending MNO to a receiving MNO wherein the receiving MNO uses a sponsor MNO within the context of SMS interworking services, comprising the following steps:
    receiving by a component in the routing path between the sending MNO and the receiving MNO an SRI for SM response sent by the receiving MNO, the SRI for SM response comprising an international mobile subscriber identity (IMSI);
    reading SMS routing information in the SRI for SM response;
    accessing data relating to an SMS interworking arrangement between the sending MNO and the receiving MNO;
    establishing, dependent on the data relating to the SMS interworking arrangement between the sending MNO and the receiving MNO, whether use of the sponsor MNO is required or preferred; and
    when use of the sponsor MNO is required or preferred, generating an amended SRI for SM response by amending the SMS routing information data in the SRI for SM response, wherein the component introduces itself as the receiving MNO to the sending MNO using a Global Title (GT) address from the sponsor MNO and replaces the IMSI in the SRI for SM response with a Sponsored B-IMSI, and sending the amended SRI for SM response to the sending MNO
    when use of the sponsor MNO is not required, passing on the SRI for SM response transparently
    receiving from the sending MNO a subsequent SMS mobile terminating (MT) request by the component and from the receiving MNO one or more SMS MT response messages by the component, wherein the component maps in the SMS MT request and the one or more SMS MT responses, the sponsored GT addresses to/from the corresponding sending MNO or receiving MNO GT addresses, and replaces in the SMS MT request the Sponsored B-IMSI with the IMSI comprised in the SRI for SM response.

11. A method as claimed in claim 10 further comprising:
    assessing data relating to existing arrangements on SMS interworking between the sending MNO and the sponsor MNO and to preferences of the receiving MNO and when an arrangement between the sending MNO and the sponsor MNO exists, amending the SMS routing information in the SRI for SM response according to the preferences of the receiving MNO.

12. A method as claimed in claim 10, further comprising checking the received SRI for SM response whether one of the following arrangements applies:
    a) the sending MNO and the receiving MNO have a direct, bilateral interworking arrangement;
    b) the sending MNO and the receiving MNO have an interworking arrangement via a hub;
    c) the sending MNO and the receiving MNO have no interworking arrangement, whereby the receiving MNO makes use of a direct, bilateral interworking arrangement of the sponsor MNO with the sending MNO; or
    the sending MNO and the receiving MNO have no interworking arrangement, whereby the receiving MNO makes use of an interworking arrangement of the sponsor MNO with the sending MNO via the hub;
    and amending the received SRI for SM response in accordance with the applicable arrangement of the arrangements a)-d).

13. A method as claimed in claim 10, further comprising:
    receiving by the component an SRI for SM request sent by the sending MNO;
    accessing data relating to the SMS interworking arrangement between the sending MNO and the receiving MNO;
    establishing, dependent on the data relating to the SMS interworking arrangement between the sending MNO and the receiving MNO, whether use of the sponsor MNO is required; and
    when use of the sponsor MNO is required, amending the SRI for SM request wherein the component introduces itself as the sending MNO to the receiving MNO using a Global Title (GT) address from the sponsor MNO; and when use of a sponsor MNO is required, not passing on the SRI for SM request transparently.

* * * * *